2 Sheets--Sheet 1

S. C. NEWELL & G. BAARS.
Improvement in Pea-Nut Pickers.

No. 129,581.  Patented July 16, 1872.

Witnesses:
A. W. Almquist
N. A. Graham

Inventors:
S. C. Newell
G. Baars
PER
Attorneys.

S. C. NEWELL & G. BAARS.
Improvement in Pea-Nut Pickers.

No. 129,581.    Patented July 16, 1872.

Witnesses:
A. W. Almquist
N. A. Graham

Inventor:
S. C. Newell
G. Baars
Per
Attorneys.

129,581

UNITED STATES PATENT OFFICE.

SAMUEL C. NEWELL AND GEORGE BAARS, OF BEARDSTOWN, TENNESSEE.

IMPROVEMENT IN PEA-NUT PICKERS.

Specification forming part of Letters Patent No. 129,581, dated July 16, 1872.

Specification describing a certain Improved Pea-Nut Picker, invented by SAMUEL C. NEWELL and GEORGE BAARS, of Beardstown, in the county of Perry and State of Tennessee.

The first part of our invention relates to breaking off or picking the nuts from the plants by means of two cylindrical rollers, so arranged, in close proximity, but not in actual contact, that when revolved in opposite directions they will fasten upon and force between them the soft and yielding plants, but cannot so fasten upon and pass the nuts; our machine being constructed upon the well-known mechanical fact that two rollers thus arranged will so operate upon anything that is small and yielding, but cannot so fasten upon and force between them anything that is hard, unyielding, and that equals one-third or one-fourth of their respective diameters. The second part of our invention relates to the final separation of the nuts from the plants after the nuts are picked off by means of two carrier-belts, so arranged, one above the other, that the upper belt shall receive the denuded plants as they come from the picking-rollers, and carry and discharge them at a remote point, while the lower belt shall receive the nuts at the same time, and carry and discharge them at a point less remote in the machine. The third part of our invention relates to cleaning the nuts from any dust, leaves, or broken stems that may chance to remain among them by means of an inverted fan, so arranged that the nuts, in falling into the chute that discharges them from the machine, shall be exposed to a strong current of wind.

Figure 1:
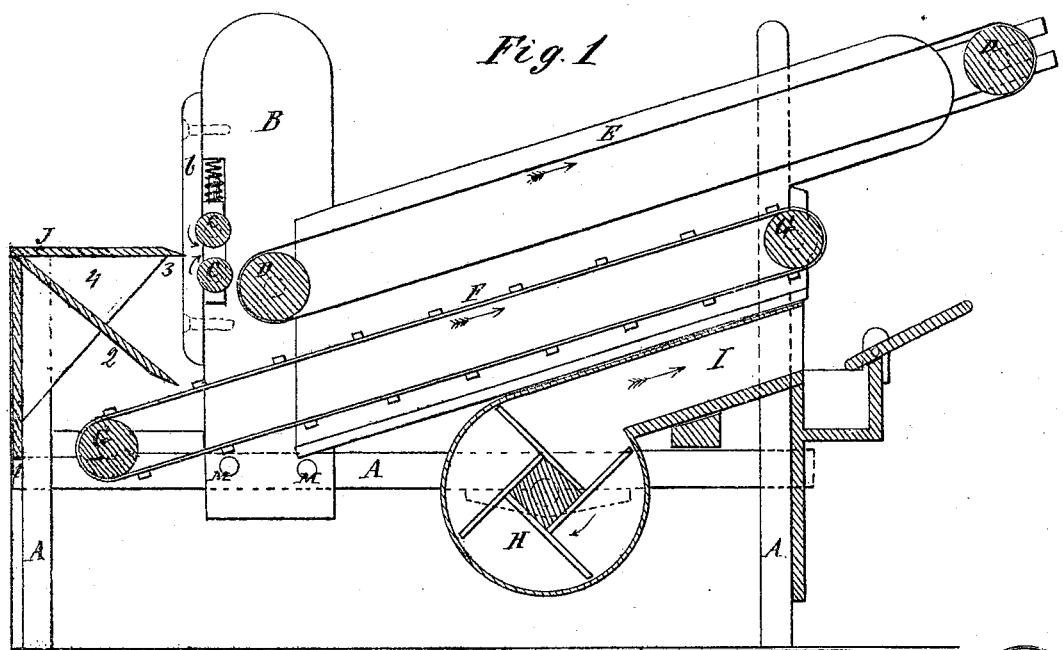
Figure 2:
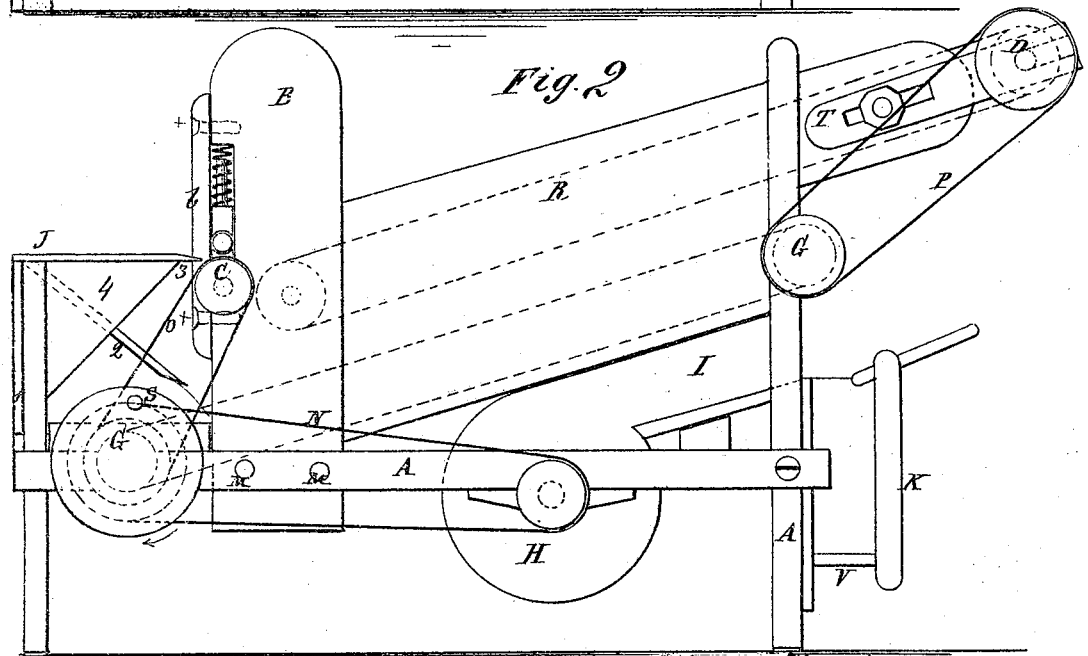

Figure 1 is a longitudinal section through the center of our machine, and showing the half that is to the left from rear end of the machine, and showing the whole of its interior construction. Fig. 2 is a side view of the machine.

Figure 3:
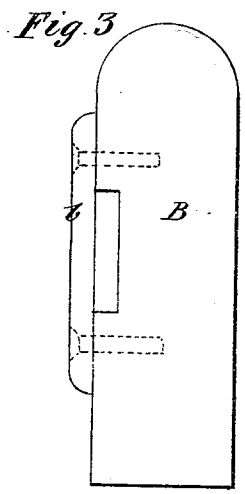

A A A A is the frame-work, which may be of wood, but should be joined together with screws or bolts that it may be kept tight and steady. R, Fig. 2, is a strong box, of plank, connecting the forward with the rear end of the machine. This box is elevated at the forward end of the machine for convenience, to give sufficient space between the discharging-point and the ground to discharge the nuts into a sack. B, Fig. 1, is a breast-post, of wood or cast-iron. It has a notch in the rear edge, deep and long enough to receive the journals and bearings of the picking-rollers. Its form and arrangement are more fully shown in Fig. 3, which is a detail side view of said post B. $b$ is a cap covering the notch to hold the bearings of the picking-rollers in place, and held in its place by the screw-bolts $x$ $x$. If this post is of wood it should be thick enough to give support to the bearings; if of iron, it must have a lip or flange (in the notch) for the same purpose. The post B is firmly bolted to the side framing at M M, Fig. 1. C C are the picking-rollers, made of any hard material (we prefer steel) correctly turned and smoothly polished, and in size not exceeding four times the diameter of the nuts. At their extreme ends, at the left side of the machine, they are furnished with pinions meshing into each other, by which means they act together, but turn in different directions. D D are drums, carrying the upper carrier-belt E. This carrier-belt is so arranged that the top of the drum nearest the rollers C shall be on a level with the top of the lower roller C, that the belt may receive the plants as they are forced through. G G are two other drums, carrying the lower carrier-belt F, upon the outside of which a small cord is fastened tortuously to prevent the nuts sliding backward when the inclination is considerable. H is a fan, discharging a strong current of wind through flue I. J is the breast of the machine, consisting of a vertical breast-board, 1, angular guard-board 2, horizontal feed-board 3, and bracket 4, all firmly nailed together and held in place by two screws passing laterally through the front posts into the bracket. By removing these screws the breast may be lifted off entire.

Figure 7:
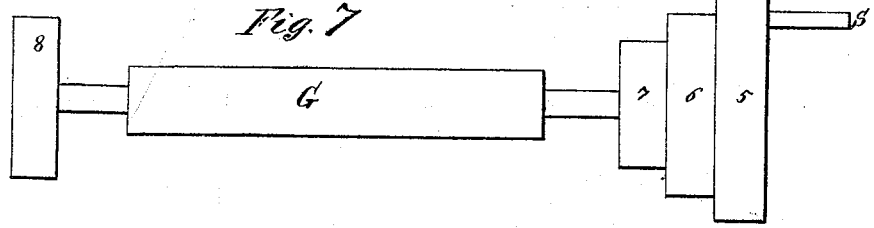
Figure 4:
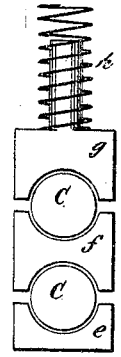
Figure 5:
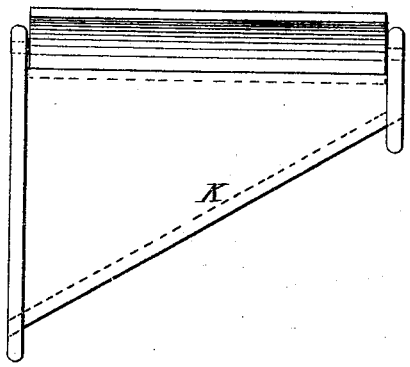
Figure 6:
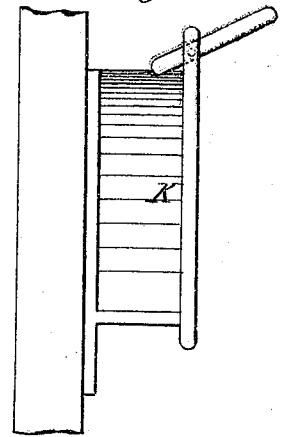

Fig. 4 illustrates the manner in which the picking-rollers are arranged in their bearings, $e$ being the lower bearing; $f$, middle bearing, to prevent actual contact; and $g$, the upper bearing, with shank, around which is wound the strong spiral-wire spring $h$, to allow the upper roller to yield upward slightly, and accommodate itself to large or small plants. To the front board, upon the front end of the machine, we attach a chute, K, to receive and discharge the nuts from the machine. This chute is simply a narrow box with a bottom and one side, the bottom at such an angle as to discharge the nuts all on one side, and the side furnished with a wind-board on pivots, that will remain as it is placed to regulate the effect of the fan-blast on the nuts. Fig. 5 is a view of this chute from front end of machine; Fig. 6, side view of same. Fig. 2 is an outside view of the right-hand side of the machine, and illustrates the manner in which we give motion to the various parts of the machine. Motion is given by pulleys on the projecting ends of the axles that pass through drums D D and G G, also fan H. Upon the projecting ends of pulley G, immediately under breast J, Fig. 7, are four pulleys, numbered 5, 6, 7, and 8. Pulley No. 5 receives power from, or, rather, receives motion from, the horse-power, or is turned by hand by wrist $s$. Pulley No. 6 (outside dotted circle, Fig. 2) drives fan H by belt N. Pulley No. 7, (inside dotted circle) Fig. 2, drives the lower picker-roller C by belt $o$, the upper roller being worked by the pinions at the opposite end. The drum proper G, Fig. 7, drives drum G, at the opposite end of machine, by carrier-belt F, Fig. 1, and drum G, driving drum D by belt P, completes the motion of all the parts. The tension of carrier-belt E and driving-belt P is regulated by the slotted sliding bars T, Fig. 2—the tension of the remaining belts by a slide on the bearing of driving-drum G, Fig. 7.

The driving-belts should be of gum or leather; but the carrier-belts may be of any flexible material, such as cotton drilling.

The operation of our machine is as follows: The plants, being placed upon the feed-board 3, are caught by the rollers and forced through, received upon carrier-belt E, and carried to its highest point and discharged; but the nuts, being too large and unyielding to pass through the rollers, are forced back and fall upon guard-board 2, thence upon lower carrier-belt F, are carried up and discharged into chute K, and, having passed through a strong current of wind from fan H, are emptied, nicely cleaned, into the sack at V.

Pulley No. 8, in Fig. 7, is extra, intended to work a scourer when desired; when not so used, it may be taken off and dispensed with.

We make no claim to the frame-work nor to the original construction of the separate parts of the machine; our claim is for the arrangement and mechanical combinations we have effected.

We claim as our invention—

1. The arrangement, in frame-work A, of breast-posts B, picking-rollers C C, and middle bearings $f$, substantially as and for the purpose hereinbefore set forth.

2. In combination with breast-posts B, picking-rollers C, and middle bearings $f$, the two carrier-belts E and F, substantially as and for the purpose hereinbefore set forth.

3. In combination with breast-post B, picking-rollers C, middle bearings $f$, and carrier-belts E and F, the fan H and pivoted wind-board on chute K, substantially as and for the purpose hereinbefore set forth.

4. The combination, in breast J, of vertical breast-board 1, angular guard-board 2, horizontal feed-board 3, and bracket 4, by which we form the whole into a movable breast, substantially as and for the purpose hereinbefore set forth.

SAMUEL C. NEWELL.
GEORGE BAARS.

Witnesses:
EDWARD ROUGNIER,
ANDREW DEE MICKLE.